US011027912B2

(12) United States Patent
Saer (10) Patent No.: US 11,027,912 B2
(45) Date of Patent: Jun. 8, 2021

(54) REMOVABLE CONTAINER SHIPPING FRAME FOR VEHICLE

(71) Applicant: Matt Saer, Charleston, SC (US)

(72) Inventor: Matt Saer, Charleston, SC (US)

(*) Notice: Subject to any disclaimer, the term of this patent is extended or adjusted under 35 U.S.C. 154(b) by 0 days.

(21) Appl. No.: 15/438,525

(22) Filed: Feb. 21, 2017

(65) Prior Publication Data

US 2018/0237216 A1 Aug. 23, 2018

(51) Int. Cl.
| | |
|---|---|
| *B60P 3/07* | (2006.01) |
| *B65D 85/68* | (2006.01) |
| *B65D 90/00* | (2006.01) |
| *B60P 3/08* | (2006.01) |
| *B61D 3/16* | (2006.01) |
| *B61D 3/18* | (2006.01) |
| *B60P 3/06* | (2006.01) |
| *B63B 25/00* | (2006.01) |
| *B63B 25/24* | (2006.01) |
| *B60P 3/077* | (2006.01) |
| *B62D 33/02* | (2006.01) |
| *B65D 85/62* | (2006.01) |
| *B63B 25/20* | (2006.01) |

(Continued)

(52) U.S. Cl.
CPC ............ *B65D 85/68* (2013.01); *B60P 3/06* (2013.01); *B60P 3/07* (2013.01); *B60P 3/077* (2013.01); *B60P 3/08* (2013.01); *B61D 3/166* (2013.01); *B61D 3/18* (2013.01); *B61D 3/188* (2013.01); *B62D 33/02* (2013.01); *B63B 25/00* (2013.01); *B63B 25/004* (2013.01); *B63B 25/008* (2013.01); *B63B 25/20* (2013.01); *B63B 25/24* (2013.01); *B65D 85/62* (2013.01); *B65D 88/129* (2013.01); *B65D 90/004* (2013.01); *B65D 90/006* (2013.01); *B65D 90/0053* (2013.01); *B65D 90/0073* (2013.01); *B63B 2025/245* (2013.01); *B63B 2025/285* (2013.01)

(58) Field of Classification Search
CPC .... B65D 85/68; B65D 90/06; B65D 90/0053; B65D 2585/6867; B65D 90/006; B65D 88/121; B65D 85/62; B65D 90/004; B65D 88/129; B60P 3/07; B60P 3/08; B60P 3/06; B60P 3/077; B63B 25/008; B63B 90/0073; B63B 25/004; B63B 2025/285; B63B 2025/245; B63B 25/20; B63B 25/24; B61D 3/18; B61D 3/166; B61D 3/188; B62D 33/02; B62D 33/0207
USPC .............. 410/4, 24, 26, 29.1; 211/191, 192; 414/498
See application file for complete search history.

(56) References Cited

U.S. PATENT DOCUMENTS

| | | |
|---|---|---|
| 4,124,119 A | 11/1978 | Nordstrom |
| 4,954,038 A | 9/1990 | Sheahan |

(Continued)

OTHER PUBLICATIONS

IPRP and Written Opinion of PCT/US2018/018930 dated Sep. 6, 2019; pp. 1-14.

*Primary Examiner* — Stephen T Gordon
(74) *Attorney, Agent, or Firm* — Singleton Law, PLLC; Chainey P. Singleton (57) ABSTRACT

The present invention provides a removable frame system for transporting vehicles in a container. The frame system is be assembled in the container, the vehicles are loaded on the frame system, the container is shipped to the location, the vehicles are unloaded from the frame system, and the frame system is disassembled and returned to the manufacture or stored for later use.

17 Claims, 3 Drawing Sheets

(51) Int. Cl.
  *B65D 88/12* (2006.01)
  *B63B 25/28* (2006.01)

(56) References Cited

U.S. PATENT DOCUMENTS

| | | | |
|---|---|---|---|
| 4,963,067 A | | 10/1990 | Gearin et al. |
| 5,286,149 A | | 2/1994 | Seay et al. |
| 5,454,672 A | * | 10/1995 | Halpin ..................... B60P 3/08 410/24 |
| 5,775,858 A | | 7/1998 | Bacon |
| 8,807,891 B2 | | 8/2014 | Clive-Smith |
| 2008/0008552 A1 | * | 1/2008 | Boydstun .................. B60P 3/08 410/24 |
| 2016/0137121 A1 | | 5/2016 | Clive-Smith |

* cited by examiner

REMOVABLE CONTAINER SHIPPING FRAME FOR VEHICLE

CROSS-REFERENCE TO RELATED APPLICATIONS

None.

TECHNICAL FIELD OF THE INVENTION

The present invention relates in general to the field of transport systems, and more particularly, to collapsible transport systems for transporting vehicles.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with transport systems. Transport frame systems have been known in the art; however, given the unique requirements of securing a vehicle for transport, the known frame systems have serious limitations. For example, the frame system must be strong enough to support the weight of the vehicle and sturdy enough to maintain stability for the vehicle. In addition, there are different types of frame systems available, some systems are installed permanently in the container, while others are removably installed in the container. The removable systems are often heavy and difficult to pull the frames from the container. In addition, the positioning of the vehicle requires a crane like frame, electric motors and so on.

For example, U.S. Pat. No. 8,807,891 entitled, "Removable frame systems for vehicle shipping" discloses a frame system for supporting two wheels of an associated vehicle for transport within an existing transportable structure such as a standard ISO container which has longitudinally extending side structures. The frame system comprising a transverse wheel supporting frame supported by two vertical posts located one at each end of the wheel supporting frame. Each post is provided with attachment means for securing the top and bottom of the post at a plurality of locations along the length of the associated side structure independent of the shape of the side structure. The wheel supporting frame is raiseable with or without a vehicle loaded thereon and once raised is fixable to the posts at a chosen location for transport within the transportable structure. The attachment means may comprise ties of adjustable length which pull each post in the fore and aft direction relative to the side structure to locate each post.

For example, U.S. Pat. No. 6,287,061 entitled, "Flatbed vehicle transport system" discloses a flatbed vehicle transport system for of the support member, cross members and ramp members. The inventive device includes a plurality of support members that are positionable within apertures within a trailer, a plurality of cross members insertable into the support members, a plurality of ramp members attached across the cross members, and a loading ramp for loading vehicles upon the trailer. A plurality of chains are preferably secured to one or more support members to prevent longitudinal movement of the structure while loaded.

The entire contents of each of which are incorporated herein by reference.

SUMMARY OF THE INVENTION

The present invention provides a removable frame system for transporting vehicles in a container. The frame system is be assembled in the container, the vehicles are loaded on the frame system, the container is shipped to the location, the vehicles are unloaded from the frame system, and the frame system is disassembled and returned to the manufacturer or stored for later use.

The frame system is modular and can be assembled and disassembled within or out of the container. The frame system includes 4 posts that extend vertically upward from the floor of the container. The posts may be attached to the floor of the container and/or attached to the walls of the container. The posts are connected to crossbars to set the width of the frame. Rails are secured to each pair of posts to set the length of the frame system. At this time the rails may be placed perpendicular to the posts or at an angle relative to the posts depending on the desired configuration and vehicle being transported. Once the frame is assembled the vehicle adaptor is positioned on the rails to secure the vehicle to the frame system. The vehicle is then positioned on the vehicle adaptors and then secured into position. The vehicle may also be secured by additional securing devices, e.g., straps, chains, cables, etc. The container can then be transported to the disembarking location so that the vehicle can be removed from the frame system. The frame system is then disassembled and stored or transported back to the originator. Although, the frame system is designed to be disassembled and removable it may be advantageous in some embodiments to permanently (or semi-permanently) fix the frame system in the container. The frame system can transport cars, trucks, ATVs, water crafts, boats, carts, trailers, conduits, building materials, culvers, and any other object that can be positioned within the frame system.

The present invention provides a removable frame system for supporting a vehicle for transport within a container comprising: a first pair of frame supports connected and stabilized by a first cross member; a second pair of frame supports opposite the first pair of frame supports and connected and stabilized by a first cross member; a first rail secured at a first end to one of the first pair of frame supports and secured at a second end to one of the second pair of frame supports; a second rail secured at a first end to one of the first pair of frame supports and secured at a second end to one of the second pair of frame supports; a first vehicle adaptor positioned from the first rail to the second rail; and a second vehicle adaptor positioned from the first rail to the second rail.

The present invention provides a method of removable installing a frame system in a container for supporting a vehicle for transport comprising the steps of: positioning a first pair of frame supports in a container, wherein each of the first pair of frame supports comprise a plurality of first apertures along the length of each of the first pair of frame supports; connecting a first crossbar to each of the first pair of frame supports to stabilize the first pair of frame supports; positioning a second pair of frame supports in the container opposite the first pair of frame supports, wherein each of the second pair of frame supports comprise a plurality of second apertures along the length of each of the second pair of frame supports; connecting a second crossbar to each of the second pair of frame supports to stabilize the second pair of frame supports; positioning at a first end of a first rail on the first member of the first pair of frame supports; inserting a first fastener through the first end and into one or more of the plurality of first apertures to secure the first rail to the first member of the first pair of frame supports; positioning at a second end of a first rail on the first member of the second pair of frame supports; inserting a second fastener through the second end and into one or more of the plurality of second apertures to secure the first rail to the first member of the second pair of frame supports; positioning at a first end of a second rail on the second member of the first pair of frame supports; inserting a first fastener through the first end of a second rail and into one or more of the plurality of first apertures to secure the second rail to the second member of the first pair of frame supports; positioning at a second end of the second rail on the second member of the second pair of frame supports; inserting a second fastener through the second end of the second rail and into one or more of the plurality of second apertures to secure the second rail to the second member of the second pair of frame supports; positioning a first vehicle adaptor over the first end of a first rail and extending to the first end of a second rail; and positioning a second vehicle adaptor over the second end of a first rail and extending to the second end of a second rail.

The present invention provides a method of transporting one or more vehicles using a removable frame system assembled in an existing transport container comprising the steps of: providing an existing container; installing a removable frame system in the existing container by positioning a first pair of frame supports in a container, wherein each of the first pair of frame supports comprise a plurality of first apertures along the length of each of the first pair of frame supports; connecting a first crossbar to each of the first pair of frame supports to stabilize the first pair of frame supports; positioning a second pair of frame supports in the container opposite the first pair of frame supports, wherein each of the second pair of frame supports comprise a plurality of second apertures along the length of each of the second pair of frame supports; connecting a second crossbar to each of the second pair of frame supports to stabilize the second pair of frame supports; positioning at a first end of a first rail on the first member of the first pair of frame supports; inserting a first fastener through the first end and into one or more of the plurality of first apertures to secure the first rail to the first member of the first pair of frame supports; positioning at a second end of a first rail on the first member of the second pair of frame supports; inserting a second fastener through the second end and into one or more of the plurality of second apertures to secure the first rail to the first member of the second pair of frame supports; positioning at a first end of a second rail on the second member of the first pair of frame supports; inserting a first fastener through the first end of a second rail and into one or more of the plurality of first apertures to secure the second rail to the second member of the first pair of frame supports; positioning at a second end of the second rail on the second member of the second pair of frame supports; inserting a second fastener through the second end of the second rail and into one or more of the plurality of second apertures to secure the second rail to the second member of the second pair of frame supports; positioning a first vehicle adaptor over the first end of a first rail and extending to the first end of a second rail; and positioning a second vehicle adaptor over the second end of a first rail and extending to the second end of a second rail; securing the removable frame system to the existing container by attaching the at least one of the first pair of frame supports, at least one of the second pair of frame supports or a combination thereof are attached to a wall of the container; attaching the at least one of the first pair of frame supports, at least one of the second pair of frame supports or a combination thereof are attached to a floor of the container or both; loading a first vehicle under the first vehicle adaptor and the second vehicle adaptor and positioning a second vehicle on the first vehicle adaptor and the second vehicle adaptor; transporting the existing container to a destination; unloading the first vehicle and the second vehicle; disassembling the removable frame system to form a disassembled removable frame system; and storing the disassembled removable frame system, shipping the disassembled removable frame system or storing the disassembled removable frame system and shipping the disassembled removable frame system.

For any of the embodiments listed herein the methods can further include the step of positioning a vehicle on the first vehicle adaptor and the second vehicle adaptor. The step of positioning a first vehicle under the first vehicle adaptor and the second vehicle adaptor and positioning a second vehicle on the first vehicle adaptor and the second vehicle adaptor. The first rail may be parallel to the second rail. The first rail may be parallel to the second rail and perpendicular to the first pair of frame supports and the second pair of frame supports. The first rail may be parallel to the second rail and at an angle relative to the first pair of frame supports. The first rail may be parallel to the second rail and at an angle of between 25 and 90 degrees relative to the first pair of frame supports. The first rail may be parallel to the second rail and at an angle of between 35 and 50 degrees relative to the first pair of frame supports. The at least one of the first pair of frame supports, at least one of the second pair of frame supports or a combination thereof may be attached to a wall of the container. The at least one of the first pair of frame supports, at least one of the second pair of frame supports or a combination thereof may be attached to a floor of the container. The additional step may include one or more hook pins comprising a hooked end, the one or more hook pins being insertable through a selected one of the plurality of first apertures, the plurality of second apertures or both and the hooked end of the one or more hook pins being engageable with standard fastening hoops attached to top and/or bottom side rails of the container. The container may be a simple container, cargo container, freight container, ISO container, shipping container, sea container, ocean container, container van, CONEX® box, sea box, c can, a 53-foot container, intermodal container, or similar container.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "container" denotes a simple container, cargo or freight container, ISO container, shipping, sea or ocean container, container van or (CONEX®) box, sea or c can. Furthermore, the term may include a trailer (i.e., a 53-foot container, intermodal container, etc.).

The present Inventors recognized the need for a frame system that is sturdy and light weight but is easily installable and removeable from the container so that the container can be used to transport other goods on its return journey. The frame system must also be capable of holding the vehicle securely in its raised transport position and handle the vertical and horizontal stresses as the container moves. The frame system must allow adjustments of the position of the vehicles within the container to maximize space.

Figure 1:
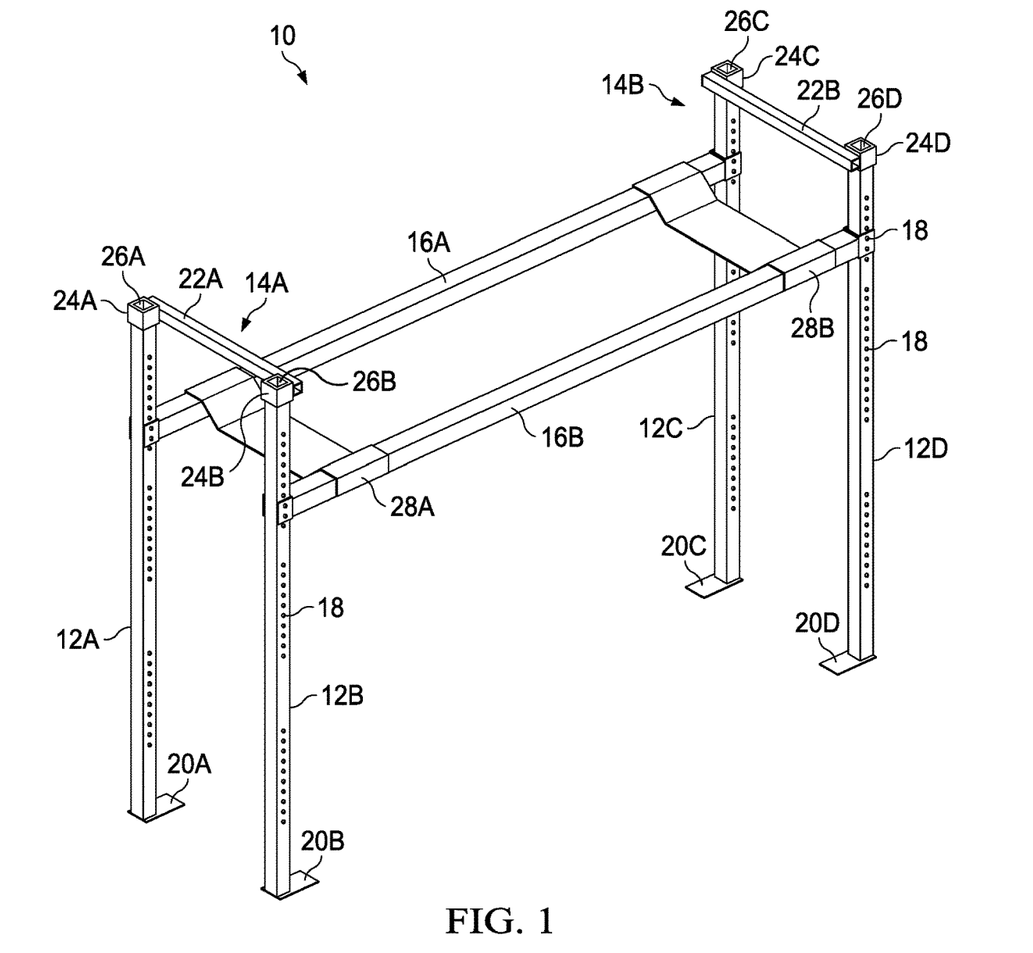
FIG. 1 is a perspective view of one embodiment of the frame system of the present invention.

FIG. 1 is a perspective view of one embodiment of the frame system of the present invention.

Figure 2:
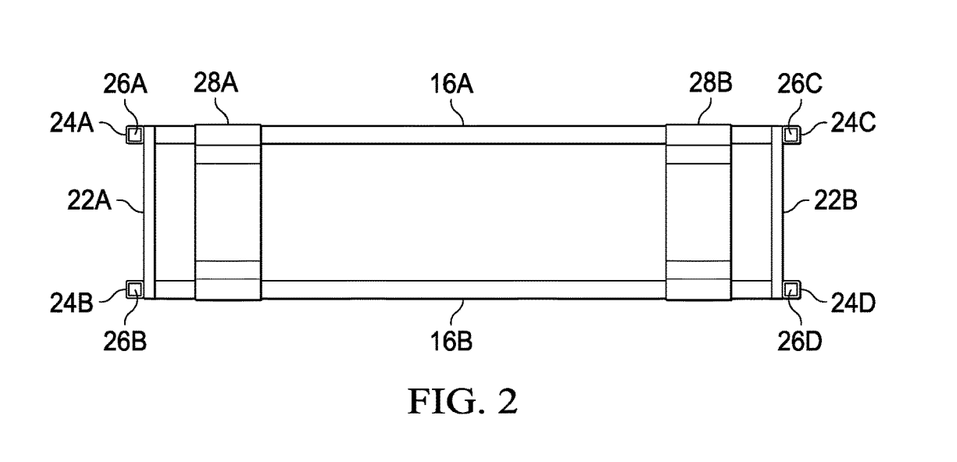
FIG. 2 is a top down view of one embodiment of the frame system of the present invention.

FIG. 2 is a top down view of one embodiment of the frame system of the present invention.

Figure 3:
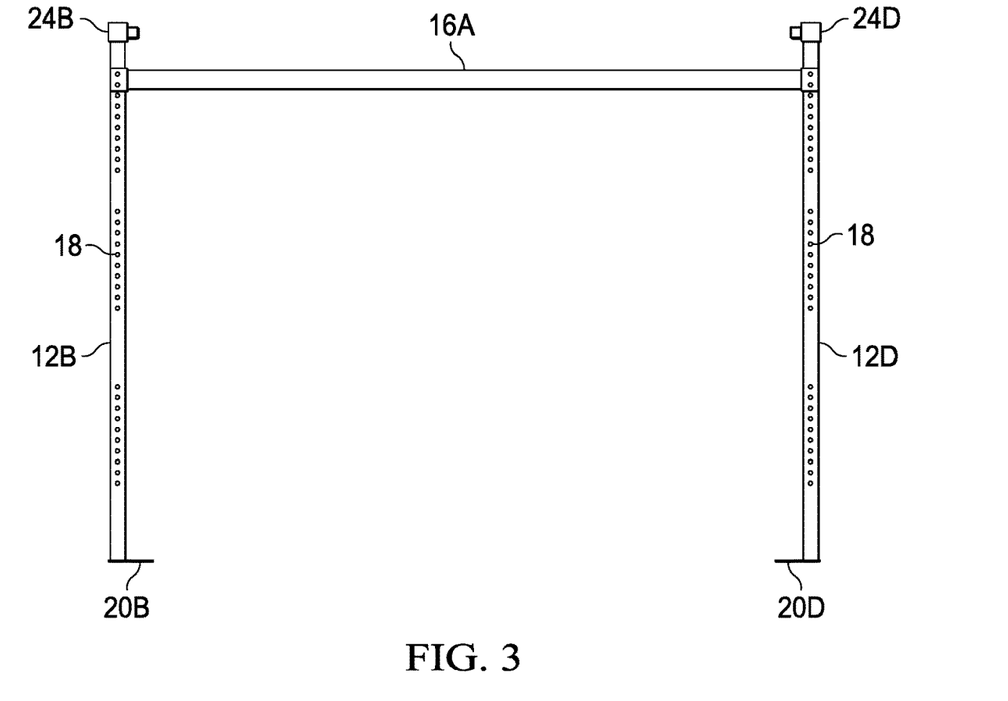
FIG. 3 is a side view of one embodiment of the frame system of the present invention.

FIG. 3 is a side view of one embodiment of the frame system of the present invention.

Figure 4:
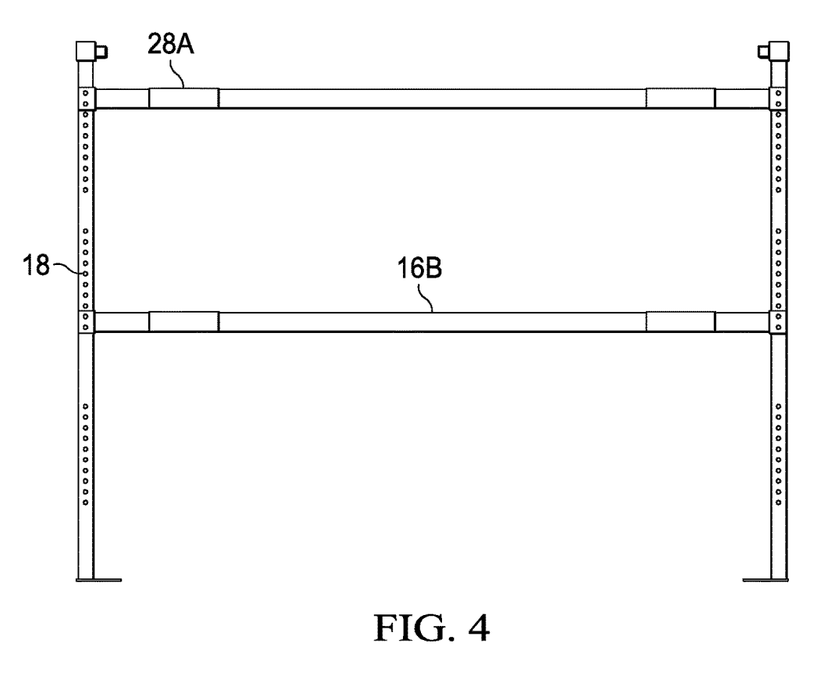
FIG. 4 is a side view of one embodiment of the frame system of the present invention having an upper set of rails and a lower set of rails.

FIG. 4 is a side view of one embodiment of the frame system of the present invention having an upper set of rails and a lower set of rails.

Figure 5:
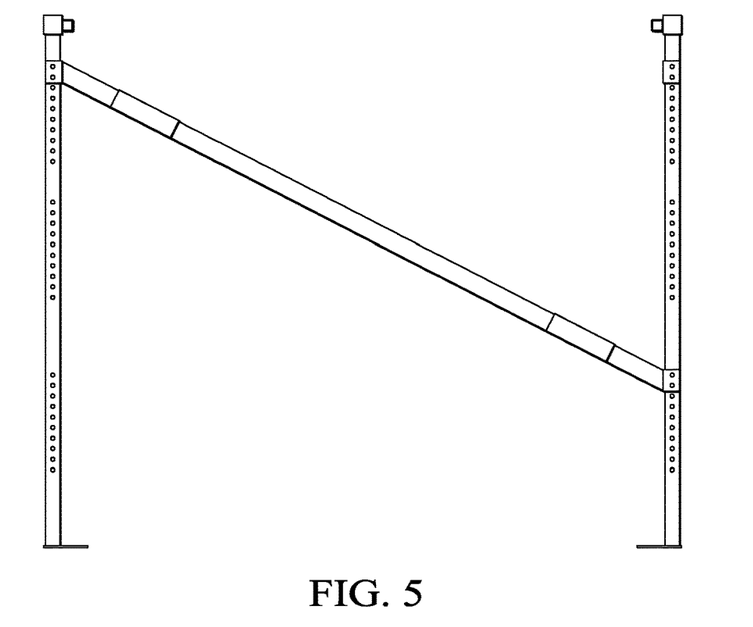
FIG. 5 is a side view of one embodiment of the frame system of the present invention having an angled set of rails.

FIG. 5 is a side view of one embodiment of the frame system of the present invention having an angled set of rails.

FIGS. 1-5 show a frame system 10 that is modular and can be assembled and disassembled within or out of the container. The frame system 10 includes 4 posts 12A-12D that extend vertically upward from the floor of the container. The dimensions of the frame system 10 are controlled by the length of the crossbar assembly 14A and 14B and rails 16A and 16B. The width of the frame system 10 is controlled by the distance between the frame supports 12A and 12B separated by crossbar assembly 14A and the corresponding frame supports 12C-12D separated by crossbar assembly 14B. This width can be varied as necessary depending on the type and dimensions of the cargo; common crossbar assembly dimensions include 24-25 inches but longer crossbar assemblies of about 27-28 inches and shorter crossbar assemblies 12-13 inches are also acceptable. The length of the frame system 10 is controlled by the distance between the frame supports 12A and 12C which are separated by rail 16A and frame supports 12B and 12D which are separated by rail 16B. This distance between the frame supports 12A and 12C and frame supports 12B and 12D can be varied as necessary depending on the cargo; common dimensions include 90-91 inches but longer 95-96 inches and shorter 45-46 inches are also acceptable.

Each of the individual frame supports 12A-12D includes numerous apertures 18 that can be spaced along the length of each individual frame supports 12A-12D. The apertures 18 extend horizontally through the individual frame supports 12A-12D. The apertures 18 are spaced on each individual post 12A-12D to position the rails 16A and 16B to accommodate various vehicles height, lengths and position. The apertures 18 are spaced to allow at least two fasteners at each end to secure rail 16A and 16B. The fasteners (not shown) may be bolts, pins or any other retaining mechanisms. Each of the individual frame supports 12A-12D includes a foot 20A-20D positioned at the bottom of each of the individual frame supports 12A-12D to provide stability. In addition, the foot 20A-20D may include an attachment point to secure the individual frame supports 12A-12D to the bottom of the container. In another embodiment, the foot extends on 2, 3 or all 4 sides of the individual frame supports 12A-12D to add further stability to the frame supports 12A-12D.

Each individual crossbar assembly 14A and 14B includes a crossbar 22A-22B and a collar 24A-24B and 24C-24D at each end of the crossbar 22A-22B. Each individual collar 24A and 24B have a collar aperture 26A and 26B that connects to the individual frame supports 12A and 12B in a fixed position relative to each other. Similarly, individual collar 24C and 24D have a collar aperture 26C and 26D that connects to the individual frame supports 12C and 12D in a fixed position relative to each other. Alternatively, the collar aperture 26A-26D may include 1 or 2 bolt apertures (not shown) that can accept fasteners that extend through the collar 24A-24D and the frame supports 12A-12D. The crossbar 22A-22B may be positioned at the top of the post 12A-12B and 12C-12D to secure the individual frame supports 12A-12B in a fixed position relative to each other; however, the crossbar assemblies 14A and 14B may be placed at a midway position between the top and the bottom of the individual frame supports 12C and 12D. In addition, a crossbar 22B may be placed at the top and a second crossbar at the middle of the individual frame supports 12C and 12D to further secure the individual frame supports 12C and 12D in a fixed position relative to each other.

The rails 16A and 16B extend from the first set of individual frame supports 12A-12B to the second individual frame supports 12C-12D. The rails 16A and 16B may be perpendicular to the individual frame supports 12A-12D using the apertures 18. The rails 16A and 16B may be positioned at any point on individual frame supports to provide the desired headspace for the vehicle being transported. In some instances the rails 16A and 16B will be placed below the midway point of the individual frame supports 12A-12D. In other embodiments, the rails 16A and 16B will be placed at the midway point of the individual frame supports 12A-12D. In still other embodiments, the rails 16A and 16B will be placed above the midway point of the individual frame supports 12A-12D. Although the figures are shown with a single set of rails, a second set of rails (not shown) may be positioned to extend between the individual frame supports 12A-12D to accommodate a second vehicle on the lower set of rails. Similarly, rails 16A and 16B may be positioned at an angle relative to the individual frame supports 12A-12B by positioning the first end of the rails 16A and 16B at a point that is not perpendicular to the individual frame supports 12A and 12B and individual frame supports 12C and 12D. The angle may be 10, 20, 25, 30, 35, 40, 45, 50, 55, 60, 65, 70, 75, and any incremental variation thereof 46, 47, 48, 49, 45.8, etc. In addition, this angled configuration will allow a vehicle to be positioned under the set of angled rails with the rails angled to accommodate the profile of the lower vehicle and allow an upper vehicle placed on the rails. In an alternative embodiment a lower set of rails may be positioned under the upper set of rails to accommodate a second vehicle. This concept may also include multiple sets of rails at alternating angles to accommodate multiple vehicles.

Vehicle adaptors 28A and 28B are positioned between the rails 16A and 16B to accommodate the vehicle. The vehicle adaptors 28A and 28B are adapted to receive a portion of the vehicle and support the weight of the vehicle. In one embodiment, the vehicle adaptors 28A and 28B are adapted to receive a motor vehicle by positioning the tires on the vehicle adaptors 28A and 28B. Although, it is common to transport motor vehicles, the present invention includes vehicle adaptors that can accommodate other vehicles including boats (boat adaptors), snowmobiles (snowmobile adaptors), trailers (trailer adaptors), watercraft (jet ski adaptors), air planes (air plane adaptors), ATVs (ATV adaptors), and anything that will fit within the container and rest between the rails 16A and 16B (miscellaneous adaptors). For example, a boat adaptor would have a profile to mate to the hull of the boat.

Figure 6A:
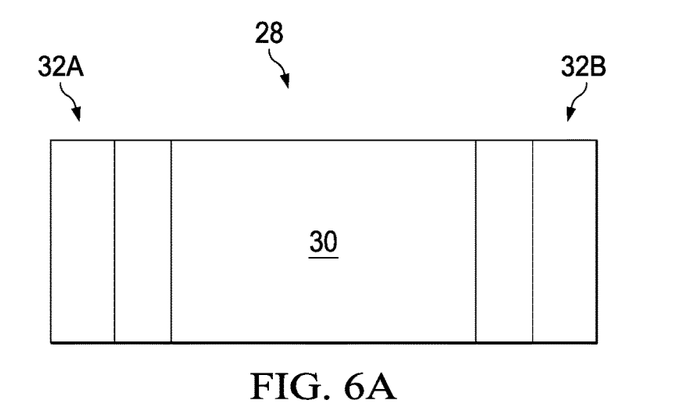
FIG. 6A is a top down view of the vehicle adaptor and FIG. 6B is a side view of the vehicle adaptor.
Figure 6B:
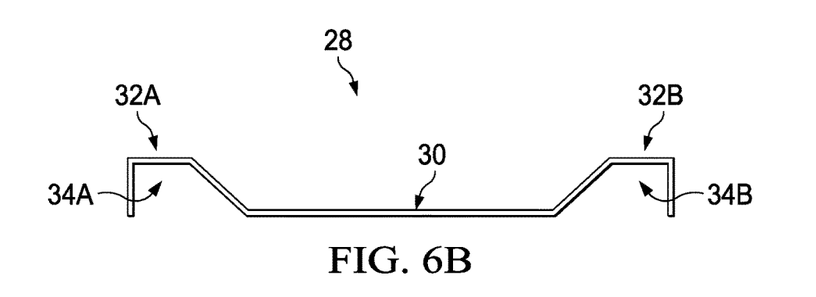

FIG. 6A is a top down view of the vehicle adaptor 28 that shows the mid portion 30 that connects to rail acceptor region 32A and 32B. FIG. 6B is a side view of the vehicle adaptor 28 showing the mid portion 30 (not shown) that extends to the first rail acceptor region 32A that extends over the first rail such that the first rail (not shown) is positioned in the first rail groove 34A. Similarly the mid portion 30 (not shown) extends to the second rail acceptor region 32B that extends over the second rail such that the second rail (not shown) is positioned in the second rail groove 34B. The vehicle adaptor 28 may be held in position by the first rail being located in the first rail groove 34A and the second rail being located in the second rail groove 34A such that gravity and the downward force of the vehicle is frictionally holding the vehicle adaptor 28 in position on the rails. Alternatively, the vehicle adaptor 28 may be secured in position on the rail using one or more fasteners (not shown) that pass through the rail acceptor region 32A and 32B into the rail groove 34A and 34B and into the respective rail.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of installing a removable front frame system in a container for supporting a vehicle for transport comprising the steps of:
   providing the container having a container front opposite a container rear;
   installing a front vehicle support system in the container front comprising the steps of:
   (1) assembling a front right frame system (14A) in the container front comprising the steps of
      positioning a first right frame support (12A) having a plurality of first right apertures in the container front,
      positioning a second right frame support (12B) having a plurality of second right apertures adjacent to the first right frame support (12A), and
      connecting a first removable crossbar (22A) to the first right frame support (12A) and the second right frame support (12B) to stabilize the front right frame system;
   (2) assembling a front left frame system (14B) in the container front opposite the front right frame system (14A) comprising the steps of
      positioning a first left frame support (12C) having a plurality of first left apertures;
      positioning a second left frame support (12D) having a plurality of second left apertures; and
      connecting a second removable crossbar (22B) to the first left frame support (12C) and the second left frame support (12D) to stabilize the front left frame system;
   (3) providing a first rail (16A) comprising a first right connecting end opposite a first left connecting end;
      connecting the first right connecting end to the first right frame support (12A);
      connecting the first left connecting end to the first left frame support (12C);
   (4) providing a second rail (16B) comprising a second right connecting end opposite a second left connecting end;
      connecting the second right connecting end to the second right frame support (12B);
      connecting the second left connecting end to the second left frame support (12D);
   (5) positioning a first vehicle adapter (28A) over the first rail (16A) and extending over the second rail (16B); and
   (6) positioning a second vehicle adapter (28B) over the first rail (16A) and extending over the second rail (16B), wherein the first vehicle adapter (28A) and the second vehicle adapter (28B) support a portion of the vehicle.

2. The method of claim 1 wherein the container is a simple container, cargo container, freight container, ISO container, shipping container, sea container, ocean container, container van, CONEX® box, sea box, a 53-foot container, or an intermodal container.

3. A method of installing a removable frame system in a container for supporting a vehicle for transport comprising the steps of:

(A) providing the container;
(B) installing a front vehicle support system in the container comprising the steps of:
   (1) assembling a front right frame system in the container comprising the steps of
      positioning a first right frame support (12A) having a plurality of first right apertures in a container front,
      positioning a second right frame support (12B) having a plurality of second right apertures adjacent to the first right frame support (12A), and
      connecting a first removable crossbar (22A) to the first right frame support (12A) and the second right frame support (12B) to stabilize the front right frame system;
   (2) assembling a front left frame system in the container front opposite the front right frame system comprising the steps of
      positioning a first left frame support (12C) having a plurality of first left apertures;
      positioning a second left frame support (12D) having a plurality of second left apertures; and
      connecting a second removable crossbar (22B) to the first left frame support (12C) and the second left frame support (12D) to stabilize the front left frame system;
   (3) providing a first rail (16A) comprising a first right connecting end opposite a first left connecting end;
      connecting the first right connecting end to the first right frame support (12A);
      connecting the first left connecting end to the first left frame support (12C);
   (4) providing a second rail (16B) comprising a second right connecting end opposite a second left connecting end;
      connecting the second right connecting end to the second right frame support (12B);
      connecting the second left connecting end to the second left frame support (12D);
   (5) positioning a first vehicle adapter (28A) over the first rail (16A) and extending over the second rail (16B);
   (6) positioning a second vehicle adapter (28B) over the first rail (16A) and extending over the second rail (16B), wherein the first vehicle adapter (28A) and the second vehicle adapter (28B) support a portion of the vehicle;
(C) installing a rear vehicle support system opposite the front vehicle support system comprising the steps of:
   (1) assembling a rear right frame system comprising the steps of
      positioning a first right rear frame support (12A) having a plurality of first right rear apertures,
      positioning a second right rear frame support (12B) having a plurality of second right rear apertures adjacent to the first right rear frame support (12A), and
      connecting a first removable rear crossbar (22A) to the first right rear frame support (12A) and the second right rear frame support (12B) to stabilize the rear right frame system;
   (2) assembling a rear left frame system opposite the rear right frame system comprising the steps of
      positioning a first left rear frame support (12C) having a plurality of first left rear apertures;

positioning a second left rear frame support (12D) having a plurality of second left rear apertures; and connecting a second removable rear crossbar (22B) to the first left rear frame support (12C) and the second left rear frame support (12D) to stabilize the rear left frame system;

(3) providing a first rear rail (16A) comprising a first right rear connecting end opposite a first left rear connecting end;

connecting the first right rear connecting end to the first right rear frame support (12A);

connecting the first left rear connecting end to the first left rear frame support (12C);

(4) providing a second rear rail (16B) comprising a second right rear connecting end opposite a second left rear connecting end;

connecting the second right rear connecting end to the second right rear frame support (12B);

connecting the second left rear connecting end to the second left rear frame support (12D);

(5) positioning a first rear vehicle adapter (28A) over the first rear rail (16A) and extending over the second rear rail (16B); and (6) positioning a second rear vehicle adapter (28B) over the first rear rail (16A) and extending over the second rear rail (16B), wherein the first rear vehicle adapter (28A) and the second rear vehicle adapter (28B) support a portion of the vehicle.

4. A method of transporting one or more vehicles in a transport container using a removable frame system comprising the steps of:

(A) providing the container;

(B) installing a front vehicle support system in the container comprising the steps of:

(1) assembling a front right frame system in the container comprising the steps of positioning a first right frame support (12A) having a plurality of first right apertures in a container front, positioning a second right frame support (12B) having a plurality of second right apertures adjacent to the first right frame support (12A), and connecting a first removable crossbar (22A) to the first right frame support (12A) and the second right frame support (12B) to stabilize the front right frame system;

(2) assembling a front left frame system in the container front opposite the front right frame system comprising the steps of positioning a first left frame support (12C) having a plurality of first left apertures;

positioning a second left frame support (12D) having a plurality of second left apertures; and connecting a second removable crossbar (22B) to the first left frame support (12C) and the second left frame support (12D) to stabilize the front left frame system;

(3) providing a first rail (16A) comprising a first right connecting end opposite a first left connecting end;

connecting the first right connecting end to the first right frame support (12A);

connecting the first left connecting end to the first left frame support (12C);

(4) providing a second rail (16B) comprising a second right connecting end opposite a second left connecting end;

connecting the second right connecting end to the second right frame support (12B);

connecting the second left connecting end to the second left frame support (12D);

(5) positioning a first vehicle adapter (28A) over the first rail (16A) and extending over the second rail (16B);

(6) positioning a second vehicle adapter (28B) over the first rail (16A) and extending over the second rail (16B);

(C) installing a rear vehicle support system opposite the front vehicle support system comprising the steps of:

(1) assembling a rear right frame system comprising the steps of positioning a first right rear frame support (12A) having a plurality of first right rear apertures;

positioning a second right rear frame support (12B) having a plurality of second right rear apertures adjacent to the first right rear frame support (12A); and connecting a first removable rear crossbar (22A) to the first right rear frame support (12A) and the second right rear frame support (12B) to stabilize the rear right frame system;

(2) assembling a rear left frame system opposite the rear right frame system comprising the steps of positioning a first left rear frame support (12C) having a plurality of first left rear apertures;

positioning a second left rear frame support (12D) having a plurality of second left rear apertures; and connecting a second removable rear crossbar (22B) to the first left rear frame support (12C) and the second left rear frame support (12D) to stabilize the rear left frame system;

(3) providing a first rear rail (16A) comprising a first right rear connecting end opposite a first left rear connecting end;

connecting the first right rear connecting end to the first right rear frame support (12A);

connecting the first left rear connecting end to the first left rear frame support (12C);

(4) providing a second rear rail (16B) comprising a second right rear connecting end opposite a second left rear connecting end;

connecting the second right rear connecting end to the second right rear frame support (12B);

connecting the second left rear connecting end to the second left rear frame support (12D);

(5) positioning a first rear vehicle adapter (28A) over the first rear rail (16A) and extending over the second rear rail (16B);

(6) positioning a second rear vehicle adapter (28B) over the first rear rail (16A) and extending over the second rear rail (16B);

(D) providing a first vehicle of the one or more vehicles;

(E) position a first portion of the first vehicle on the first vehicle adapter (28A) and the second vehicle adapter (28B) to support the first portion of the first vehicle; and (F) position a second portion of the first vehicle on the first rear vehicle adapter (28A) and the second rear vehicle adapter (28B) to support the second portion of the first vehicle.

5. The method of claim 4, further comprising the step of connecting to the container at least one selected from the first right frame support (12A), the second right frame support (12B), the first left rear frame support (12C), the second left rear frame support (12D), the second removal removable rear crossbar (22B), and the first removable rear crossbar (22A).

6. The method of claim 4 further comprising the step of
   (1) providing a second vehicle;
   (2) moving the first rail (16A) and the second rail (16B) above a portion of the second vehicle to position the first vehicle adapter (28A) and the second vehicle adapter (28B) above a portion of the second vehicle;
   (3) moving the first rear rail (16A) and the second rear rail (16B) above a second portion of the second vehicle to position the first rear vehicle adapter (28A) and the second rear vehicle adapter (28B) above the second portion of the second vehicle; and
   (4) positioning the second vehicle under the first vehicle.

7. The method of claim 4 wherein the first rail (16A) and the second rail (16B) are positioned higher than the first rear rail (16A) and the second rear rail (16B).

8. The method of claim 4 wherein an angle between the first rail (16A) and the first rear rail (16A) relative to a container floor is between 25 and 90 degrees.

9. The method of claim 4 wherein an angle between the first rail (16A) and the first rear rail (16A) relative to a container floor is between 35 and 50 degrees.

10. The method of claim 4 wherein the first rail (16A), the second rail (16B), the first rear rail (16A) and the second rear rail (16B) are positioned at a same height.

11. The method of claim 4 wherein the first rail (16A) is parallel to the second rail (16B).

12. The method of claim 4 wherein the container is a simple container, cargo container, freight container, ISO container, shipping container, sea container, ocean container, container van, CONEX® box, sea box, a 53-foot container, or an intermodal container.

13. The method of claim 3 wherein the container is a simple container, cargo container, freight container, ISO container, shipping container, sea container, ocean container, container van, CONEX® box, sea box, a 53-foot container, or an intermodal container.

14. The method of claim 3, further comprising the step of connecting at least one selected from the first right frame support (12A), the second right frame support (12B), the first left rear frame support (12C), the second left rear frame support (12D), the second removable rear crossbar (22B), and the first removable rear crossbar (22A) to the container.

15. The method of claim 3 wherein the first rail (16A) and the second rail (16B) are positioned at a same height.

16. The method of claim 1 wherein the first right connecting end comprises a first right connecting aperture that aligns with one of the plurality of first right apertures to accept a first right fastener to secure the first rail (16A) to the first right frame support (12A); the first left connecting end comprises a first left connecting aperture that aligns with one of the plurality of first left apertures to accept a first left fastener to secure the first rail (16A) to the first left frame support (12C); the second right connecting end comprises a second right connecting aperture that aligns with one of the plurality of second right apertures to accept a second right fastener to secure the second rail (16B) to the second right frame support (12B); and the second left connecting end comprises second left connecting aperture that aligns with one of the plurality of second left apertures to accept a second left fastener to secure the second rail (16B) to the second left frame support (12D).

17. The method of claim 3 wherein the first right connecting end comprises a first right connecting aperture that aligns with one of the plurality of first right apertures to accept a first right fastener to secure the first rail (16A) to the first right frame support (12A); the first left connecting end comprises a first left connecting aperture that aligns with one of the plurality of first left apertures to accept a first left fastener to secure the first rail (16A) to the first left frame support (12C); the second right connecting end comprises a second right connecting aperture that aligns with one of the plurality of second right apertures to accept a second right fastener to secure the second rail (16B) to the second right frame support (12B); and the second left connecting end comprises a second left connecting aperture that aligns with one of the plurality of second left apertures to accept a second left fastener to secure the second rail (16B) to the second left frame support (12D) and wherein the first right rear connecting end comprises a first right rear connecting aperture that aligns with one of the plurality of first right rear apertures to accept a first right rear fastener to secure the first rear rail (16A) to the first right rear frame support (12A); the first left rear connecting end comprises a first left rear connecting aperture that aligns with one of the plurality of first left rear apertures to accept a first left rear fastener to secure the first rear rail (16A) to the first left rear frame support (12C); the second right rear connecting end comprises a second right rear connecting aperture that aligns with one of the plurality of second right rear apertures to accept a second right rear fastener to secure the second rear rail (16B) to the second right rear frame support (12B); and the second left rear connecting end comprises second left rear connecting aperture that aligns with one of the plurality of second left rear apertures to accept a second left rear fastener to secure the second rear rail (16B) to the second left rear frame support (12D).

* * * * *